United States Patent
Calva et al.

(10) Patent No.: US 9,228,546 B2
(45) Date of Patent: Jan. 5, 2016

(54) METHOD FOR ACTUATING AN ELEMENT IN THE AIR SUPPLY TRACT OF AN INTERNAL COMBUSTION ENGINE, IN PARTICULAR A THROTTLE FLAP

(71) Applicant: Robert Bosch GmbH, Stuttgart (DE)

(72) Inventors: Elias Calva, Stuttgart (DE); Matthias Cwik, Stuttgart (DE); Ewald Mauritz, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 13/731,527

(22) Filed: Dec. 31, 2012

(65) Prior Publication Data

US 2013/0180503 A1   Jul. 18, 2013

(30) Foreign Application Priority Data

Dec. 30, 2011   (DE) .......................... 10 2011 090 149

(51) Int. Cl.
| | |
|---|---|
| *F02N 15/00* | (2006.01) |
| *F02N 11/00* | (2006.01) |
| *F02M 35/10* | (2006.01) |
| *F02B 29/08* | (2006.01) |
| *F02D 41/04* | (2006.01) |
| *F02D 41/06* | (2006.01) |
| *F02N 11/08* | (2006.01) |
| *F02D 11/10* | (2006.01) |
| *F02D 41/00* | (2006.01) |

(52) U.S. Cl.
CPC .............. *F02M 35/10* (2013.01); *F02B 29/083* (2013.01); *F02D 11/10* (2013.01); *F02D 41/0005* (2013.01); *F02D 41/042* (2013.01); *F02D 41/065* (2013.01); *F02N 11/0844* (2013.01); *F02D 2011/102* (2013.01); *F02N 2200/047* (2013.01); *Y02T 10/146* (2013.01)

(58) Field of Classification Search
CPC   F02M 35/10; F02N 11/0803; F02N 11/0818; F02N 11/0844; F02D 11/10; F02D 41/065; F02D 41/042; F02B 29/083
USPC ................ 123/399, 339.1, 327, 179.3, 179.4, 123/179.25, 179.28, 179.18; 701/103, 110, 701/113
See application file for complete search history.

(56) References Cited

U.S. PATENT DOCUMENTS

| | | | |
|---|---|---|---|
| 8,290,693 B2 * | 10/2012 | Shoda et al. .................. | 701/113 |
| 2010/0282199 A1 | 11/2010 | Heyers et al. | |
| 2011/0184626 A1 | 7/2011 | Mauritz et al. | |
| 2011/0239974 A1 | 10/2011 | Shoda et al. | |

FOREIGN PATENT DOCUMENTS

| | | |
|---|---|---|
| CN | 102140990 | 8/2011 |
| DE | 102006011644 | 9/2007 |
| DE | 102008041037 | 2/2010 |
| DE | 102010045547 | 10/2011 |
| EP | 2177740 | 4/2010 |
| JP | 2010223007 | 10/2010 |

* cited by examiner

*Primary Examiner* — Hai Huynh
(74) *Attorney, Agent, or Firm* — Michael Best & Friedrich LLP

(57) ABSTRACT

A method for actuating an element (22) in the air supply tract (29) of an internal combustion engine (19), characterized in that the element (22) is actuated such that it opens the air supply tract (29) before the pinion (10) engages into the toothed ring (16) of the internal combustion engine (19).

10 Claims, 3 Drawing Sheets

METHOD FOR ACTUATING AN ELEMENT IN THE AIR SUPPLY TRACT OF AN INTERNAL COMBUSTION ENGINE, IN PARTICULAR A THROTTLE FLAP

BACKGROUND AND SUMMARY OF THE INVENTION

In the field of start/stop systems, new functionalities within the engine controller are being developed in order to meet the changed demands on the starter actuation, fuel injection, operating strategy etc. For the present method according to the invention, consideration is given to the regulation of the cylinder air charge and the fuel injection of an internal combustion engine in start/stop operation. According to the prior art, in start/stop operation, after the initiation of an engine stop, the throttle flap is closed (for diesel engines for example in order to minimize shut-down juddering) and the enablement of the fuel injection or ignition is withdrawn. The restart of the internal combustion engine is prepared for during the run-down by the opening of the throttle flap and the enablement of the injection or ignition. This is realized within the engine controller by means of rotational speed thresholds, wherein the rotational speed which is used (angle-based updating in accordance with synchronization calculation) is filtered in relation to a tooth-based rotational speed of the engine sensor.

In a conventional start/stop system without the "engagement during run-down" function, there is adequate time available for the preparation of the restart capability of the internal combustion engine by means of said two processes. A restart is initiated only after the detection of a standstill state of the internal combustion engine. At this time, the preparation of the restart is complete, and the time duration of the restart (for example the duration from the setting of the start demand to the attainment of the idle rotational speed) is not influenced.

This changes in the so-called "change of mind" situation with engagement during the run-down. If a restart is demanded by the vehicle driver shortly after a stop demand, it is possible by means of the "engagement during run-down" function for the starter motor to be engaged already during the run-down of the internal combustion engine. The time duration for the opening of the throttle flap and the enabling of the injection and/or ignition are time-critical in this case. The restart capability of the internal combustion engine must in this case be produced punctually at the time of engagement. As a result of the expansion of the start/stop functionality to include "engagement during run-down", an adaptation of already-existing engine control functions must also be carried out.

Below, a method will be presented which describes the actuation of the throttle flap and the injection for preparation of the restart of an internal combustion engine after "engagement during run-down" in the "change of mind" situation.

BRIEF DESCRIPTION OF THE DRAWINGS

The invention will be explained in more detail on the basis of at least one exemplary embodiment with reference to drawings, in which.

DETAILED DESCRIPTION

Figure 1:
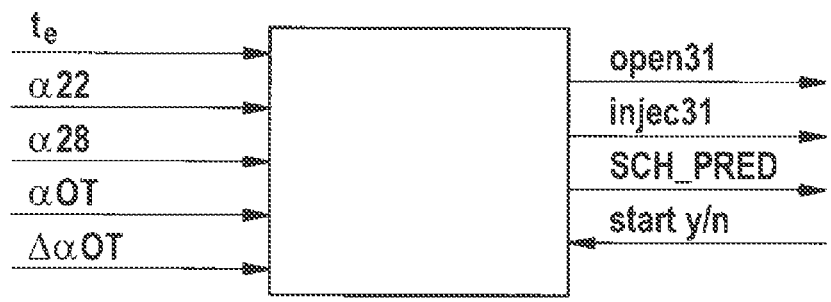
FIG. 1 shows the influential parameters of the method according to the invention.

The input variables of the method according to the invention are an engagement time te at which a pinion 10 of a starting device 13 engages into a toothed ring 16 of an internal combustion engine 19, FIG. 1. The engagement time te is determined by means of a prediction of the run-down of the internal combustion engine 19, step S1, FIG. 2. As part of the prediction, which is based on known methods, it is determined which rotational position a driveshaft of the internal combustion engine will assume at which future point in time. This serves ultimately to determine that forthcoming time te at which the pinion 10 (FIG. 3) should expediently engage into the toothed ring 16, step S2. Furthermore, a position angle ALPHA22 of an element 22 (for example throttle flap) of a valve 25 and a rotational angle ALPHA28 are also input. The latter angle describes a rotational position of a driveshaft 28 (crankshaft angle) of the internal combustion engine 19. A measured air pressure p28 in the air supply tract 28 may alternatively also be input instead of the position angle 22. Also input are an angle position of a top dead center ALPHAOT and an angle interval ALPHADELTA between top dead centers of two cylinders 30. Finally, a signal "start y/n" is input, from which it can be identified whether or not the restart is complete.

The output variables are a signal open22 for opening the element 22 (for example throttle flap), which signal can assume the value 0 or 1. A further signal injec31, which can assume the value 0 or 1, serves for the enablement of the injection of fuel through an injection valve 31. In the case of applied-ignition engines, the ignition is simultaneously activated. If the element 22 is erroneously actuated and therefore the expected or predicted run-down has been considerably disrupted, the method for predicting the run-down must be changed. The corresponding signal is the signal changeprog. An evaluation of the erroneous actuation should be carried out in individual cases.

In the method according to the invention, at a time tp, a prediction of the run-down of the internal combustion engine 19 is determined. For this purpose, use may be made of various alternative methods which are already known. As part of the selected method, it is for example determined that the method begins automatically below a rotational speed typical of the engine. Specifically, the prediction yields a forecast for the rotational speed profile n(t) of the driveshaft 28. On the basis of specifications, for example of a rotational speed range for a minimum engagement rotational speed nemin and a maximum engagement rotational speed nemax, an engagement time te at an engagement rotational speed ne is determined therefrom.

Figure 4:
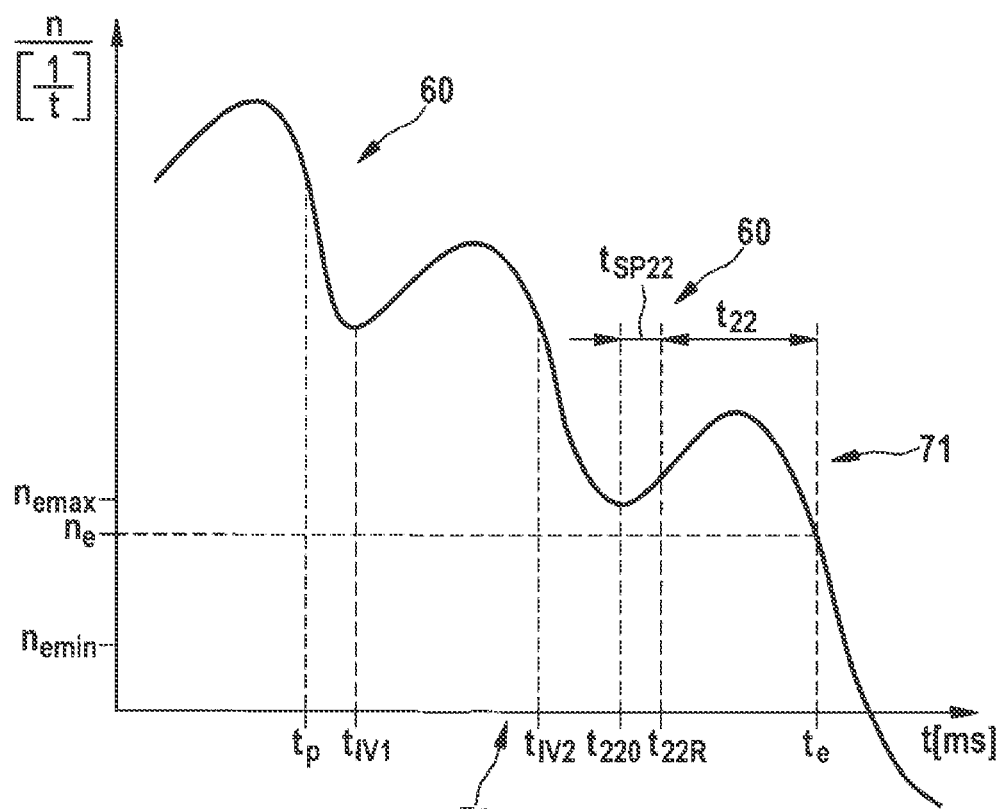
FIG. 4 shows a time progression.
Figure 5:
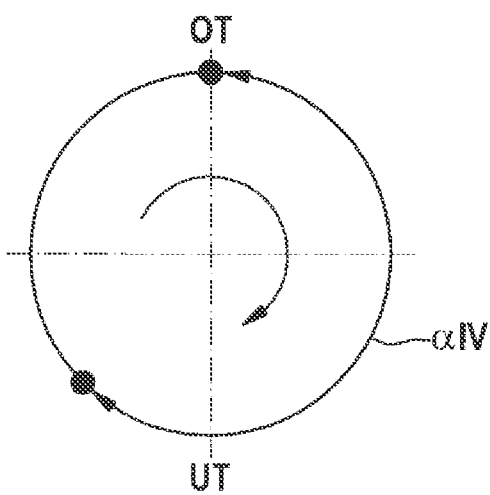
FIG. 5 shows a schematic illustration of the opening angle of an inlet valve.

The knowledge of the engagement time te makes it possible to determine when the element 22 must at the latest be actuated in order that, at the desired time te, it is where possible open to the maximum extent, or the desired air pressure p28 is set then. To open the element 22 to a maximum extent or to produce a desired open state, step S3, a certain time duration t22 (ramp function) is required in which a motor (not illustrated) opens the element 22. In order that the motor opens, a signal open22 must be processed, for which a signal processing time tsp22 (signal delay) is required. The time at which a signal evaluation unit 34 must output a signal is thus brought forward from to by the time durations t22 and tsp22, resulting in the time t22o for the opening of the element 22. For tsp22, the time duration may vary; the minimum value should be used here. The time duration t22 emerges from the ramp function from the start of the opening from the initial angle position ALPHAstart to the attainment of the final angle ALPHAend. If an adequate air pressure p28 has built up already before the angle ALPHAend has been reached, the time duration t22 may be shortened. If the actuation of the element 22 is varied by the controller of the internal combustion engine, the corresponding time duration t22 must be adapted. If there is a resulting negative time for the time t22o, t22o must be set equal to tp. After the signal processing time has elapsed, the adjustment of the element 22 begins at the time t22R, FIG. 4. It is also necessary to specify the times at which the inlet valve 37 is opened (t1V1) and closed (t1V2). FIG. 5 briefly illustrates the angle range ALPHAIV over which the valve is open in this case.

It is demanded here that the engine run-down is not changed. For this purpose, one or more inlet valves 37 of the next and most recent cylinder 30 to be in the compression stroke must be closed before the opening of the element 22.

Figure 2:
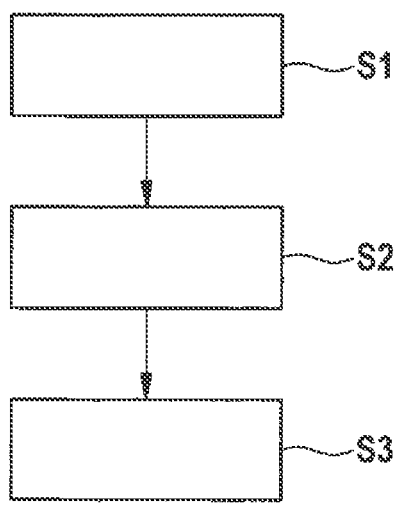
FIG. 2 shows a schematic functional process for the opening of the element.
Figure 3:
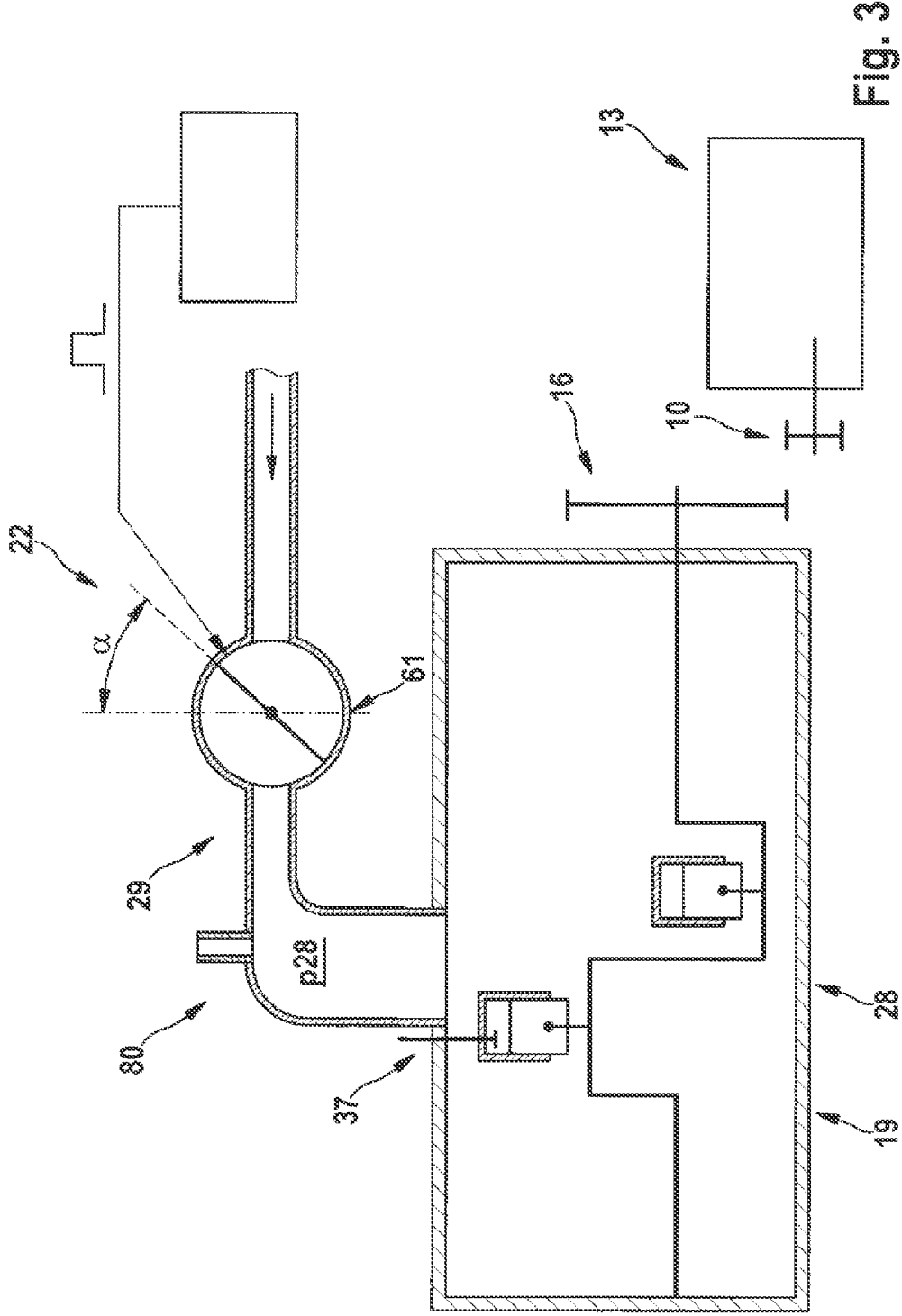
FIG. 3 shows an arrangement according to the invention.

There is thus disclosed a method for actuating an element 22 in the air supply tract 29 of an internal combustion engine 19, in particular a throttle flap, wherein the internal combustion engine 19 has a driveshaft 28 which is coupled to a toothed ring 16, and the internal combustion engine 19 has at least one cylinder 30 with at least one inlet valve 37, wherein the internal combustion engine 19 is in the run-down phase and the rotational speed of the driveshaft 28 is thus decreasing, with the generation of rotational speed fluctuations 60, wherein the internal combustion engine 19 is coupled to a starting device 13 which has a pinion 10 for engaging into the toothed ring 16, which pinion serves to set the driveshaft 28 of the internal combustion engine 19 in rotation in order to permit starting of the internal combustion engine 19, and the element 22 is in an at least approximately closed position 61 illustrated by dashed lines in FIG. 2, wherein the element 22 is actuated such that it opens the air supply tract 29 before the pinion 10 engages into the toothed ring 16 of the internal combustion engine 19. The time te of the engagement of the pinion 10 into the toothed ring 16 is determined by means of a prediction method.

To determine the time t22o at which signal processing for the purpose of realizing the adjustment of the element 22 should begin, a signal processing time tSP22 and an adjustment time t22 are subtracted from the engagement time te.

In the case of signal processing times tSP22 of different magnitudes, the shortest should be used.

At the time te of the engagement, an inlet valve 37 of that cylinder 30 which was most recently in the compression stroke before the engagement is already closed.

In the event of the occurrence of rotational speed fluctuations 60, at least one relative minimum 70 and at least one relative maximum 71 are generated. The element 22 is open when the inlet valve 37 for the cylinder 30 is already closed.

In the event of an erroneous actuation of the element 22, a characteristic of a run-down is varied and a prediction of the run-down is adapted for example as a function of the air pressure in the air supply tract 29 or a position of the element 22.

For the calculation of the injection quantity, the injection duration and the injection angle, the injection must be re-enabled punctually. If the maximum delay time is negligible—this is the case for example for a delay time of less than 5% of the restart time—then the injection should be re-enabled only when te is reached. That is to say the associated signal injec31 is set to 1 when t>te. This is particularly important for auto-ignition diesel engines in which the air, after the opening of the element 22, provides ignition conditions already at the time of the start of injection, and can result in an intense rotational speed increase during the engine run-down. As a result of said rotational speed increase, under some circumstances, the rotational speed difference between the pinion 10 and the toothed ring 16 is increased, which can have an unfavorable effect on the engagement process of the pinion 10 into the toothed ring 16. The service life of the starting device 13, in particular of the pinion 10 but also of the toothing of the toothed ring 16, can decrease considerably. If the maximum delay time is not negligible in relation to the restart time, then the following can be calculated for the time tinject at which the injection is reactivated: tinject=te−tinjectcalc−tinjectsp. tinjectcalc is the time duration required for the calculation, and tinjectsp is the time period required for the processing of the signal in order to be able to commence the calculation.

When the engagement time te is reached, an injection 80 is reactivated.

What is claimed is:

1. A method for actuating an element (22) in an air supply tract (29) of an internal combustion engine (19), wherein the internal combustion engine (19) has a driveshaft (28) which is coupled to a toothed ring (16), and the internal combustion engine (19) has at least one cylinder (30) with at least one inlet valve (37), wherein the internal combustion engine (19) is in a run-down phase and a rotational speed of the driveshaft (28) is thus decreasing, with generation of rotational speed fluctuations (60), wherein the internal combustion engine (19) is coupled to a starting device (13) which has a pinion (10) for engaging into the toothed ring (16), which pinion serves to set the driveshaft (28) of the internal combustion engine (19) in rotation in order to permit starting of the internal combustion engine (19), and the element (22) is in an at least approximately closed position (61), comprising actuating the element (22) such that the element opens the air supply tract (29) before the pinion (10) engages into the toothed ring (16) of the internal combustion engine (19), wherein at a time (te) of engagement of the pinion (10) into the toothed ring (16), an inlet valve (37) of a cylinder (30) which was most recently in a compression stroke before the engagement is already closed.

2. The method according to claim 1, characterized in that the time (te) is determined by a prediction method (S1).

3. The method according to claim 1, characterized in that to determine a time (t22o) at which signal processing for the purpose of realizing adjustment of the element (22) should begin, a signal processing time (tSP22) and an adjustment time (t22) are subtracted from the time of engagement (te).

4. The method according to claim 3, characterized in that, in the case of signal processing times (tSP22) of different magnitudes, the shortest signal processing time is used.

5. The method according to claim 1, characterized in that the element (22) is open when the inlet valve (37) for the cylinder (30) is already closed.

6. The method according to claim 1, characterized in that, in the event of an erroneous actuation of the element (22), a characteristic of a run-down is varied and a prediction of the run-down is adapted.

7. The method according to claim 1, characterized in that, in the event of an erroneous actuation of the element (22), a characteristic of a run-down is varied and a prediction of the run-down is adapted as a function of the air pressure in the air supply tract (29).

8. The method according to claim 1, characterized in that, in the event of an erroneous actuation of the element (22), a characteristic of a run-down is varied and a prediction of the run-down is adapted as a function of a position of the element (22).

9. The method according to claim 1, characterized in that, in the event of an erroneous actuation of the element (22), a characteristic of a run-down is varied and a prediction of the run-down is adapted as a function of the air pressure in the air supply tract (29) or a position of the element (22).

10. The method according to claim 1, characterized in that, when the engagement time (te) is reached, an injection (80) is reactivated.

\* \* \* \* \*